Nov. 18, 1969

C. E. G. LIND 3,478,688

PUMP DRIVEN BY AN ELECTRIC MOTOR

Filed Sept. 7, 1967

INVENTOR
CARL ERIC GOTTFRID LIND

BY

ATTORNEY

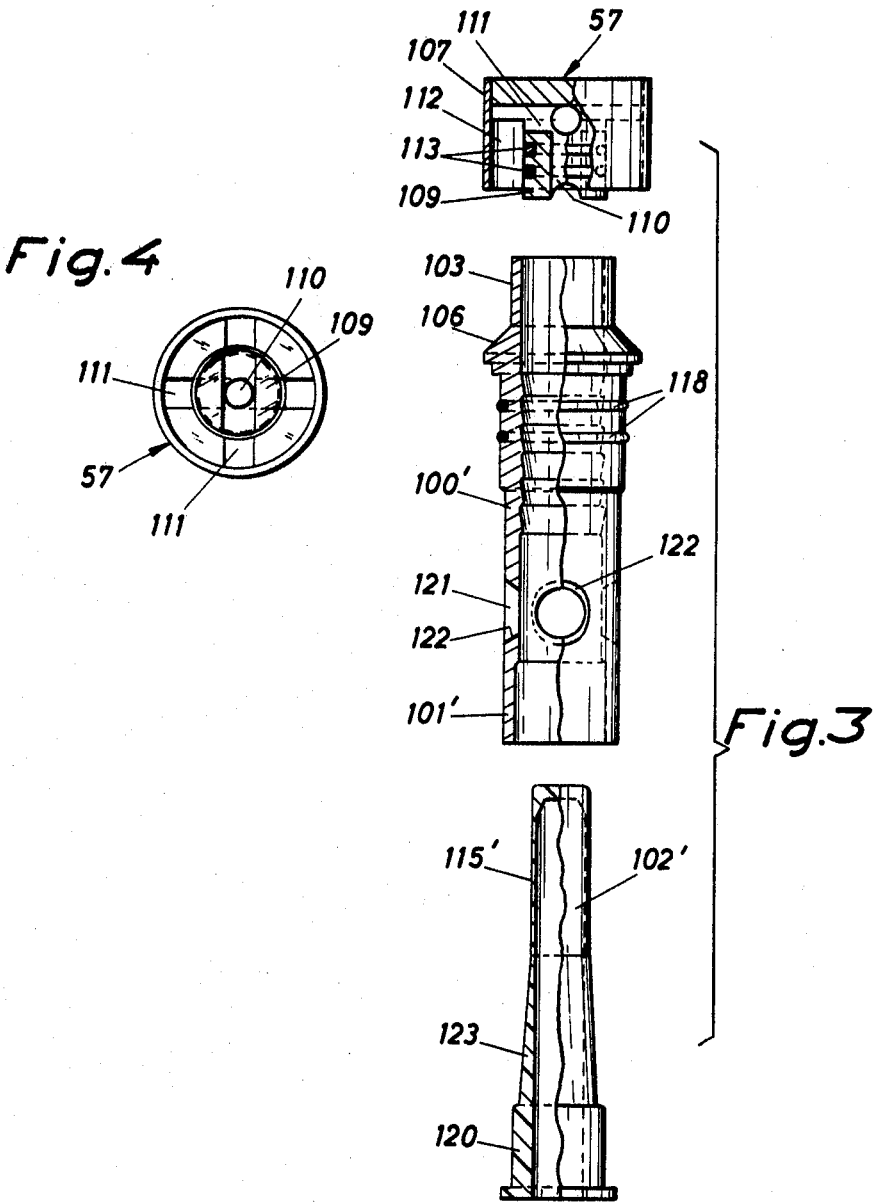

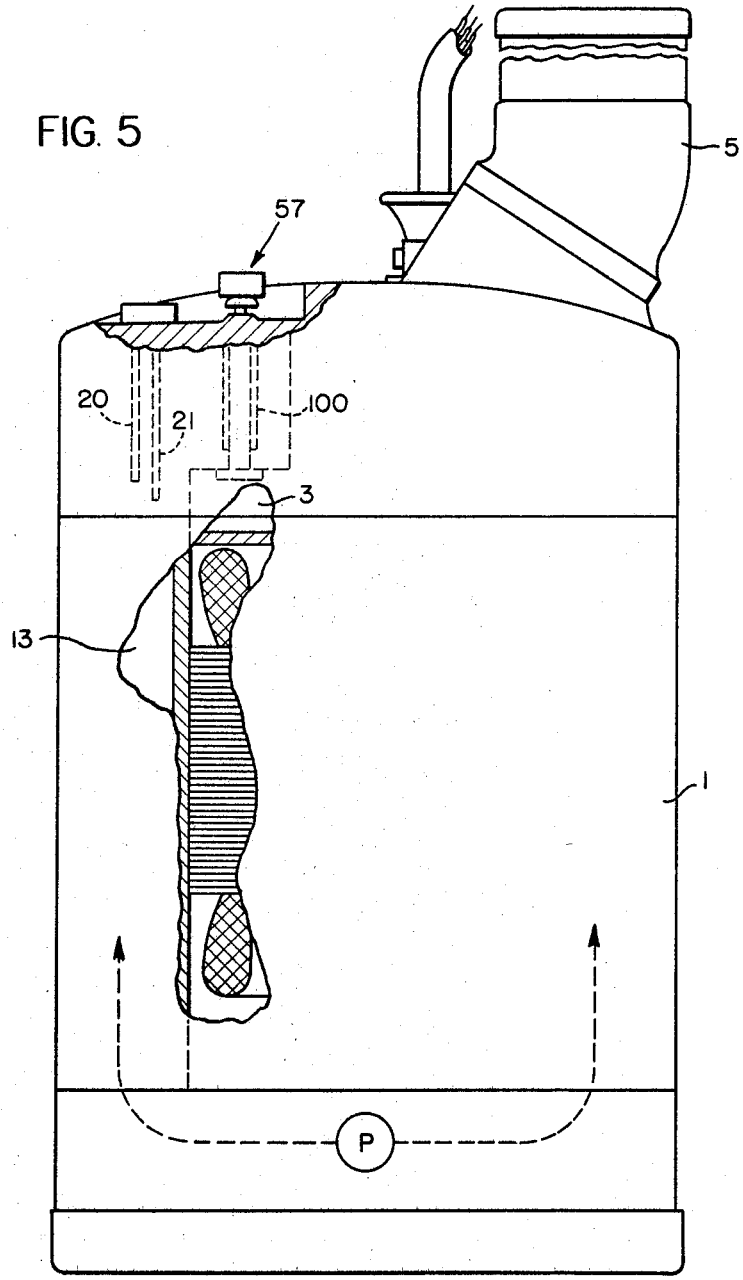

United States Patent Office 3,478,688
Patented Nov. 18, 1969

3,478,688
PUMP DRIVEN BY AN ELECTRIC MOTOR
Carl Eric Gottfrid Lind, Partille, Sweden, assignor to Aktiebolaget Svenska Precisionsverktyg, Nacka, Sweden, a corporation of Sweden
Filed Sept. 7, 1967, Ser. No. 666,008
Claims priority, application Sweden, Nov. 14, 1966, 15,527/66
Int. Cl. F04d 15/00
U.S. Cl. 103—25      14 Claims

ABSTRACT OF THE DISCLOSURE

A valve for a pump having pumping chamber, a second chamber communicating with the pump chamber, and a motor for operating the pump when liquid in the second chamber exceeds a certain level, comprises a sleeve mounted in a vent in the top of the second chamber, an axially bored plug secured in the upper end of the sleeve, and a flexible tube closed at one end and having its closed end extending into the sleeve, and its open end communicating with the pump chamber. Normally the closed end of the tube is spaced from the inner wall of the sleeve to vent the second chamber through the plug, but when the pump is operating, increased pressure in the pump chamber expands the tube into contact with the inner wall of the sleeve and the lower end of the plug to seal then vent.

---

Figure 1:
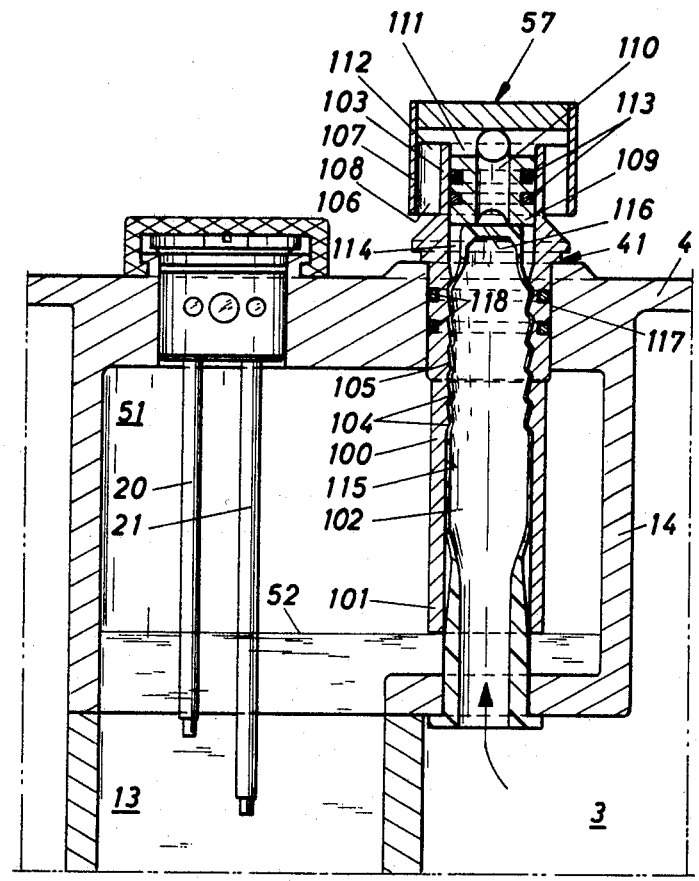

This invention relates to pumps driven by an electric motor.

More particularly this invention relates to pumps driven by an electric motor and of the type disclosed in my copending U.S. patent application Ser. No. 661,411, filed Aug. 17, 1967, and intended for at least partial immersion in a tank for pumping liquid from the tank, and provided with a chamber communicating with the liquid and with a device adapted to close an electric circuit, thereby to start the electric motor when the liquid level in the chamber rises over a predetermined level, and to interrupt the circuit thereby to stop the motor when the liquid level falls below a predetermined lower level, said chamber at its top being provided with an air outlet and a valve disposed in said outlet, said valve being adapted to seal the air outlet on actuation by positive pressure prevailing in the pump chamber during operation of the pump.

Still more particularly this invention relates to such pumps driven by an electric motor which are intended for pumping of electrically conductive liquid, such as contaminated water, for example, which may be constituted by wash water containing slime or mud and which are provided with electrodes forming part of the electric circuit. The electrodes are disposed within a chamber communicating with the liquid surrounding the pump on the outside thereof. They are devised so as to start the electric motor when the liquid level in the chamber rises so much that an electric connection between the electrodes is obtained through the liquid, and to cut off the circuit when the liquid level falls below the electrodes. The chamber has the air outlet near its top located so that an air cushion is formed above the liquid level in the electrode chamber, part of at least of one of the electrodes extending through said air cushion. Provided in the air outlet is a valve so arranged as to seal the air outlet due to actuation by positive pressure prevailing in the pump chamber during operation of the pump. On immersion of the pump into the contaminated liquid such liquid flows through said valve into the electrode chamber which is filled with liquid except for the air cushion remaining at the top portion of the chamber.

Previously known constructions of valves for this purpose have the drawback that they are easily clogged by mud and as a consequence fail to close completely. This results in the liquid level within the electrode chamber falling at the same rate as the liquid level outside the pump. This results in turn results in the electric motor being stopped automatically in spite of a considerable quantity of water which is intended to be drawn up remaining unpumped around the pump. If, however, the valve is tight, liquid is retained in the electrode chamber until the liquid level around the pump has fallen down to the inlet to the pump chamber below the lower end of the electrode chamber. It is not before that moment that air penetrates from below into the electrode chamber and displaces the rest of liquid therefrom whereupon the circuit through the electrodes is interrupted and the pump stopped.

There has earlier been proposed in my above-noted copending application a valve fitted into the air inlet and provided with an annular seat which is enclosed by a sleeve-shaped membrane which is adapted due to actuation by positive pressure prevailing in the pump chamber to encase said annular seat in a sealing manner. Peripheral or circumferential grooves are formed on both sides of the annular seat, axial channels opening into said grooves for flow of liquid or air when the pump is out of operation. When highly contaminated liquid is pumped the peripheral grooves show a tendency of becoming clogged.

The present invention has for its main object to improve said valve.

According to a main feature of the invention the valve comprises a sleeve open at both ends and having internally disposed annular seats, and a membrane made of some resilient material and extending axially into said sleeve and adapted to be actuated by the pressure prevailing in the pump chamber, said membrane being devised so as to become expanded by positive pressure prevailing in the pump chamber and thereby become pressed with its wall against the seats. Due to the fact of the membrane being expanded on pressure increase in the pump chamber on start of the pump and pressed radially outwards against the annular seats to leave said seats again on reduction of said pressure a kind of pumping effect is created in the valve and as a consequence thereof also an automatic cleaning thereof effected.

A further object of the invention is to reinforce the automatic cleaning effect by giving the membrane a thimble-resembling shape. Due to its shape the membrane during the expansion also is extended in axial direction and thereafter on reduction of pressure returns to the contracted starting position.

Figure 2:
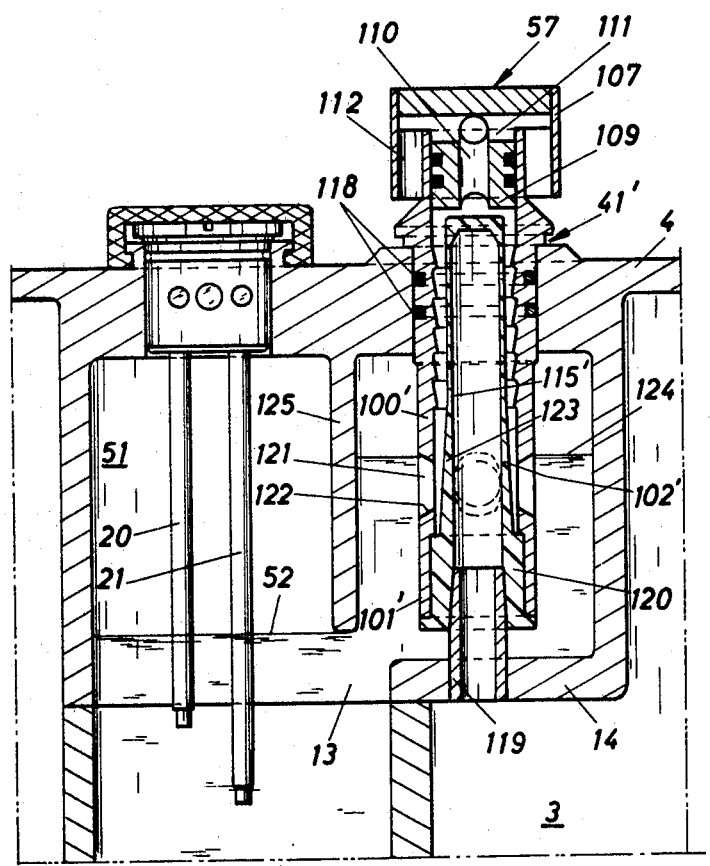

Further objects, advantages and characterizing features of the invention will become evident from the following description, considered in connection with the accompanying drawings which form part of this specification and of which:

FIG. 1 is a vertical section through the upper end of the electrode chamber of an electrically driven drainage pump having a valve constructed according to the invention in the air outlet from the chamber, FIG. 2 is a similar section through a valve constructed according to another embodiment of the invention, FIG. 3 shows the valve of FIG. 2 in exploded representation and with parts partly shown in a longitudinal section, FIG. 4 is an end elevation of the hood of the valve, seen from below, FIG. 5 is an elevational view of the pump housing with parts thereof cut away and shown in section, and illustrating schematically the direction of flow of fluid through the housing.

The valve 41 shown in FIG. 1 consists of three principal parts, viz. a sleeve 100 inserted from above through a wall 4 of a flow passage channel 3, formed in pump housing 1 (FIG. 5) said sleeve with its lower end 101 projecting from above into an electrode chamber 13, a thimble-resembling membrane 102 made of rubber or some similar resilient material and axially introduced from below into the sleeve 100, said membrane with its lower end passing through the wall 14 of the flow passage 3 so as to cause the pressure prevailing in said channel to be transferred into the interior of said membrane 102, and a hood 57 pushed over the upper end 103 of the sleeve 100. The chamber 13 and the flow passage channel 3 communicate at their lower ends both with one another and with the pump P, as illustrated schematically by the broken lines and arrows in FIG. 5.

The sleeve 100 is on its internal surface formed with a number of annular upsets or ribs 104 serving as seats and having their upper sides 105 inclined downwardly in the direction inwards to the longitudinal center axis of the sleeve. At its top the sleeve 100 is provided with an external and downwardly directed collar 106, an annular clearance 108 being formed between said collar and the lower edge 107 of the hood.

The membrane 102 is suitably made of synthetic rubber, advantageously so-called nitrile rubber. This material has great wearing strength and is oil-resistant.

The hood 57 is provided with a plug 109 introduceable axially into the sleeve end 103 and, as also will be seen in FIG. 4, is formed with an axial flow passage channel 110, a number of horizontal flow channels 111 starting from the upper end thereof and a number of vertical channels 112 formed adjacent the outer edge of the hood 57 and opening into the annular clearance 108. The plug 109 is removably inserted into the sleeve end 103 and kept in sealing position by means of two O-rings 113.

When the pump assembly is immersed into the liquid to be drawn up, the electrode chamber 13 is filled with liquid which enters housing 1 both from below in the usual manner through an inlet (not illustrated) in housing 1, and through the hood 57 from above. Here the liquid enters through the annular clearance 108 and flows through the channels 112, 111 and the channel 110 and further through the clearance 114 between the membrane 102 and the sleeve 100 and downwards into the electrode chamber 13 where the liquid rises to the level 52. Above said level the air cushion 51 is formed.

When the pump is started and the pressure in the flow channel 3 is increased the membrane 102 is expanded and its cylindrical wall 115 pressed tightly against the upsets or ribs 104 whereby the valve 41 is closed totally. The membrane is extended also axially in an upward direction until its upper closed end 116 reaches the lower end of the plug 109. On reduction of the pressure in the channel 3 and in connection therewith also in the interior of the membrane 102 this latter returns to its starting position. The contraction of the membrane both radially and axially causes some sliding of the membrane wall 115 on the upsets or ribs 104 whereby adhering mud particles are removed and fall down into the electrode chamber 13. In this way a kind of automatic cleaning of the valve 41 is obtained.

The sleeve 100 is sealed against the bore 117 by means of two O-rings 118. It can together with the hood 57 be drawn up out of the electrode chamber 13 for the purpose of cleaning and survey. When the sleeve 100 again is to be put in its place it must be positioned so that the membrane 102 actually projects through the lower end 101 of the sleeve.

As is understood from FIG. 1, the membrane 102 when being mounted must be pushed up from the flow channel 3 through the wall 14 into the interior of electrode chamber 13. If the membrane must be replaced it is necessary to disassemble the pump casing. FIGS. 2 and 3 show a construction of the valve 41' whereby both the assemblage and the cleaning and survey of the valve are rendered easier. A tubular socket 119 is provided in the wall 14 and projects with its free upper end vertically into the electrode chamber. The membrane 102' is inserted from below into the valve sleeve 100' and engages with its thicker lower end 120 the lower end 101' of the valve sleeve with rather strong friction. The sleeve 100' is provided with radial bores 121 located above said thicker portion 120. The walls 122 of the bores 121 diverge outwardly as in an inversed hopper. Due to the inclination of the walls 122 mud particles are prevented from adhering to the walls.

The valve illustrated in the FIGS. 2 and 3 operates in the same manner as that shown in FIG. 1. When the membrane wall 115' due to the inner positive pressure in the float channel 3 and in the membrane 102' is pressed against the wall of the sleeve 100' the slightly thicker wall portion 123 is also expanded adjacent the lower end of the membrane and pressed in the direction towards the bores 121, whereas said portion on reduction of the pressure returns into its starting position. A kind of pumping effect is thus created at that place so that solid particles possibly collected here from the liquid are forced out of the valve sleeve.

When the valve 41' is drawn out of the electrode chamber 13 for survey, the membrane 102' follows with it and thus can be easily replaced, if necessary.

When the electrode chamber 13 is filled with liquid the liquid level will rise to the upper edge of the bores 121. In order to prevent the air cushion 51 around the electrodes 20, 21 from becoming too low, the electrode chamber is provided with a screen wall 125 projecting downwardly from the upper wall 4. Around the electrodes 20, 21 the liquid thus cannot rise higher than to the level 52 determined by the lower edge of the screen wall 125.

The valve 41, 41' can be used for other types of pumps as well as that described above. As an example, such pumps may be mentioned, which in their chamber 13 have a float which in response to the liquid level 52 in said chamber through a level, for example actuates a switch, such as a microswitch, for switching in and out the contactor of the electric motor. In this case the chamber has no electrodes. The membrane 102 can, if desired, be formed as a suitably gas-filled blister adapted to be actuated from outside by the pressure prevailing in the flow channel 3.

While several more or less specific embodiments of the invention have been shown and described, it is to be understood that this is for purpose of illustration only, and that the invention is not to be limited thereby, but its scope is to be determined by the appended claims.

What I claim is:

1. The combination with a pump driven by an electric motor and of the type intended to be immersed in a liquid for pumping the liquid from a pump chamber and provided with a second chamber (13) communicating with the liquid in the pump chamber, and a device adapted to close an electric circuit to start the motor when the liquid level within the second chamber exceeds a predetermined level and to interrupt the circuit, thereby to stop the motor when said liquid level falls below a predetermined lower level, said second chamber at its top being provided with a fluid outlet, of valve means (41) located therein for sealing the outlet on actuation by a positive pressure prevailing in the pump chamber, said valve means (41) comprising a sleeve (100) open at both ends and having on its interior wall annular seat means, and a substantially tube-shaped elongated membrane made of resilient material and having a closed end and an open end, the interior of said membrane communicating through its open end with the pump chamber, at least the main portion of said membrane extending axially into said sleeve so that a fluid passage is formed along the outer wall of the membrane and the inner wall of the sleeve, said membrane being adapted to become expanded by positive pressure prevailing in the pump chamber, thereby to be pressed along its outer wall (115) against the seat means to close said outlet.

2. The combination claimed in claim 1 wherein the membrane is thimble-shaped.

3. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve being constituted by a sleeve (100) open at both ends and having on its interior wall annular seats (104) and a membrane (102) made of some resilient material and extending axially into said sleeve and adapted to be actuated by the pressure within the pump chamber, said membrane being adapted to become expanded by positive pressure prevailing in the pump chamber, thereby to have its wall (115) pressed against the seats (104) to close the outlet, the membrane (102) having its open end penetrating through the wall (14) of the pump chamber.

4. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve comprising a sleeve (100) open at both ends and having on its interior wall annular seats, a membrane (102) of resilient material extending axially into said sleeve and adapted to be expanded by positive pressure prevailing in the pump chamber thereby to have its wall (115) pressed against the seats (104) to close the outlet, the membrane penetrating the wall of the channel (3) through which the liquid drawn up by the pump is removed.

5. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve being constituted by a sleeve (100) open at both ends and having on its interior wall annular seats (104) and a membrane (102) made of some resilient material and extending axially into said sleeve and adapted to be actuated by the pressure within the pump chamber, said membrane being adapted to become expanded by positive pressure prevailing in the pump chamber, thereby to have its wall (115) pressed against the seats (104) to close the outlet, the membrane (102') with its open end being pushed over a socket member (119) which penetrates through the wall (14) of the pump chamber.

6. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve being constituted by a sleeve (100) open at both ends and having on its interior wall annular seats (104) and a membrane (102) made of some resilient material and extending axially into said sleeve and adapted to be actuated by the pressure within the pump chamber, said membrane being adapted to become expanded by positive pressure prevailing in the pump chamber, thereby to have its wall (115) pressed against the seats (104) to close the outlet, the membrane being pushed over a socket member which penetrates the wall of the channel (3) through which the liquid drawn up by the pump is removed.

7. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve being constituted by a sleeve (100) open at both ends and having on its interior wall annular seats (104) and a membrane (102) made of some resilient material and extending axially into said sleeve and adapted to be actuated by the pressure within the pump chamber, said membrane being adapted to become expanded by positive pressure prevailing in the pump chamber, thereby to have its wall (115) pressed against the seats (104) to close the outlet, the seats being constituted by annular ribs (104) formed on the inner wall of the sleeve (100).

8. In a pump as claimed in claim 7 the upper side (105) of the ribs (104) being inclined downwardly in the direction towards the longitudinal axis of the sleeve (100).

9. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve being constituted by a sleeve (100) open at both ends and having on its interior wall annular seats (104) and a membrane (102) made of some resilient material and extending axially into said sleeve and adapted to be actuated by the pressure within the pump chamber, said membrane being adapted to become expanded by positive pressure prevailing in the pump chamber, thereby to have its wall (115) pressed against the seats (104) to close the outlet, a hood (57) covering the upper end of the sleeve (100) said hood having a plug (109) engaging said sleeve end and removably fixed thereto, said plug having a through-flow channel (110) communicating with at least one downwardly directed channel (112) formed in a portion of the hood (57) extending adjacent the outside of said upper sleeve end (103).

10. In a pump as claimed in claim 9 said portion of the hood (57) extending adjacent the outside of the upper sleeve end (103) forming an annular clearance (108) together with a downwardly and outwardly inclining collar (106) formed on said sleeve end.

11. In a pump as claimed in claim 9 the membrane (102, 102') being devised so as when expanded to engage with its closed end (116) the inner end of the plug (109) of the hood (57).

12. The combination claimed in claim 1 wherein the sleeve (100) is formed with air outlets (121) positioned so that an air cushion (51) is formed in the upper portion of the chamber (13).

13. In a pump driven by an electric motor and of the type intended for pumping of liquid through a pump chamber and provided with a second chamber (13) communicating with the liquid in the pump chamber and a device adapted to close the electric circuit and to start the motor when the liquid level within the second chamber exceeds a predetermined level and to interrupt the circuit and thereby to stop the motor when said liquid level falls below a predetermined lower level, said second chamber (13) at its top being provided with an air outlet and a valve (41) located therein, said valve being adapted to seal the air outlet on actuation by positive pressure prevailing in the pump chamber, said valve being constituted by a sleeve (100) open at both ends and having on its interior wall annular seats (104) and a membrane (102) made of some resilient material and extending axially into said sleeve and adapted to be actuated by the pressure within the pump chamber, said membrane being adapted to become expanded by positive pressure prevailing in the pump chamber, thereby to have its wall (115) pressed against the seats (104) to close the outlet, the sleeve (100') being formed with air outlet channels (121) positioned so that an air cushion (51) is formed in the upper portion of the second chamber (13).

14. In a pump as claimed in claim 13 a screen wall (125) projecting downwards from the roof of the chamber (13), in combination with the valve being disposed to define the height of the air cushion (51) independent of the location of air outlets (121) in the sleeve (100').

References Cited
UNITED STATES PATENTS

| | | | |
|---|---|---|---|
| 2,488,506 | 11/1949 | Bernhardt | 103—25 |
| 2,656,794 | 10/1953 | Williamson | 103—25 |
| 2,782,016 | 2/1957 | Fannelli | 137—392 |
| 3,131,335 | 4/1964 | Berglund et al. | 137—392 |
| 3,303,785 | 2/1967 | Pearce | 103—25 |

WILLIAM L. FREEH, Primary Examiner

U.S. Cl. X.R.
137—392, 394